(12) United States Patent
Spies et al.

(10) Patent No.: US 7,636,461 B2
(45) Date of Patent: Dec. 22, 2009

(54) IMAGE-WIDE ARTIFACTS REDUCTION CAUSED BY HIGH ATTENUATING OBJECTS IN CT DEPLOYING VOXEL TISSUE CLASS

(75) Inventors: Lothar Spies, Aachen (DE); Celine Saint Olive, Aachen (DE); Michael Kaus, Hamburg (DE); Vladimir Pekar, Hamburg (DE); Himanshu P. Shukla, Lafayete, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 683 days.

(21) Appl. No.: 10/597,566

(22) PCT Filed: Jan. 24, 2005

(86) PCT No.: PCT/IB2005/050279

§ 371 (c)(1),
(2), (4) Date: Jul. 31, 2006

(87) PCT Pub. No.: WO2005/076221

PCT Pub. Date: Aug. 18, 2005

(65) Prior Publication Data

US 2008/0253635 A1 Oct. 16, 2008

Related U.S. Application Data

(60) Provisional application No. 60/541,981, filed on Feb. 5, 2004.

(51) Int. Cl.
*G06K 9/00* (2006.01)

(52) U.S. Cl. .................. 382/128; 382/131; 382/181; 382/224; 382/275

(58) Field of Classification Search .................. 382/128, 382/131, 181, 224, 275; 378/4
See application file for complete search history.

(56) References Cited

U.S. PATENT DOCUMENTS 5,243,664 A 9/1993 Tuy (Continued)

OTHER PUBLICATIONS

Chen, L., et al.; A novel method for reducing high attenuation object artifacts in CT reconstructions; 2002; Proc. of SPIE; vol. 4684; pp. 841-850.

(Continued)

*Primary Examiner*—Tom Y Lu

(57) ABSTRACT

A reconstruction processor (34) reconstructs acquired projection data (S) into an uncorrected reconstructed image (T). A classifying algorithm (66) classifies pixels of the uncorrected reconstructed image (T) at least into metal, bone, tissue, and air pixel classes. A clustering algorithm (60) iteratively assigns pixels to best fit classes. A pixel replacement algorithm (70) replaces metal class pixels of the uncorrected reconstructed image (T) with pixel values of the bone density class to generate a metal free image. A morphological algorithm (80) applies prior knowledge of the subject's anatomy to the metal free image to correct the shapes of the class regions to generate a model tomogram image. A forward projector (88) forward projects the model tomogram image to generate model projection data ($S_{model}$). A corrupted rays identifying algorithm (100) identifies the rays in the original projection data (S) which lie through the regions containing metal objects. A corrupted rays replacement algorithm (102) replaces the corrupted regions with corresponding regions of the model projection data to generate corrected projection data (S'). The reconstruction processor (34) reconstructs the corrected projection data (S) into a corrected reconstructed 3D image (T').

17 Claims, 3 Drawing Sheets

U.S. PATENT DOCUMENTS

Figure 1:
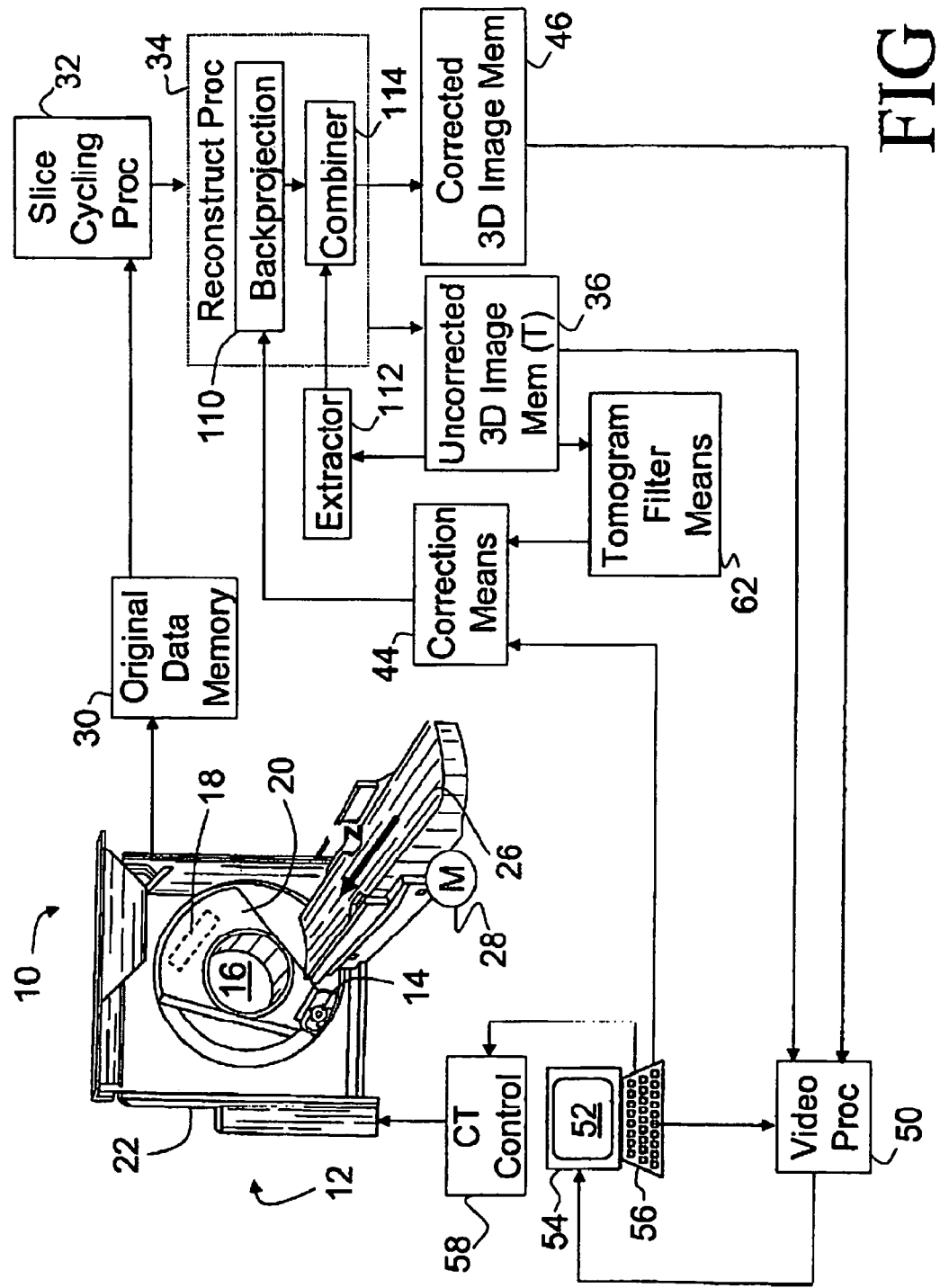

| | | | | |
|---|---|---|---|---|
| 5,416,815 | A | * | 5/1995 | Hsieh .............................. 378/4 |
| 5,825,910 | A | * | 10/1998 | Vafai ........................... 382/132 |
| 5,909,476 | A | * | 6/1999 | Cheng et al. ................... 378/4 |
| 5,933,471 | A | | 8/1999 | Kalvin |
| 6,035,012 | A | | 3/2000 | Hsieh |
| 6,055,295 | A | * | 4/2000 | Murthy et al. .............. 378/151 |
| 2001/0028696 | A1 | | 10/2001 | Yamada et al. |

OTHER PUBLICATIONS

Kalender, W.A., et al.; Reduction of CT Artifacts Caused by Metallic Implants; 1987; Radiology; 164(2)576-577.

Meagher, J.M., et al.; CT Image Correction for Beam Hardening Using Simulated Projection Data; 1990; IEEE Trans. on Nuclear Science; 37(4)1520-1524.

Saint Olive, C., et al.; Segmentation aided adaptive filtering for metal artifact reduction in radio-therapeutic CT images; 2004; Proc. of SPIE; vol. 5370; pp. 1991-2002.

Sonka, M., et al.; Handbook of Medical Imaging; 2000; vol. 2; pp. 101-119.

K-Means Clustering Overview; http://predictivepatterns.com/docs/WebSiteDecs/Clustering/K-Means_Clustering_O . . . Jan. 22, 2004.

Li; Overview on Computer-Assisted Medical Image Segmentation; http://pce.unwaterloo.ca/-freeman/ECE710T8web/Jim2.pdf Feb. 2, 2004.

Zheng, F.; K-Means-Based Fuzzy Classifier; http://www.isip.msstate.edu/publications/courses/ece_8443/papers/2001/kmeans/p02_paper_v0.pdf.

\* cited by examiner

IMAGE-WIDE ARTIFACTS REDUCTION CAUSED BY HIGH ATTENUATING OBJECTS IN CT DEPLOYING VOXEL TISSUE CLASS

CROSS REFERENCE TO RELATED APPLICATIONS

This application claims the benefit of U.S. provisional application Ser. No. 60/541,981 filed Feb. 5, 2004, which is incorporated herein by reference.

The present application relates to the diagnostic imaging arts. It finds particular application in computed tomography imaging of a subject that includes high density regions such as metal implants, dental fillings, and the like, and will be described with particular reference thereto. However, it also finds application in other types of tomographic imaging such as single photon emission computed tomography (SPECT), positron emission tomography (PET), three-dimensional x-ray imaging, and the like.

In CT imaging, high absorbing objects such as metal bodies may cause significant artifacts, which may compromise the diagnostic value of the image. Metal artifacts arise when the imaged region of interest contains metal implants, dental fillings, bullets, or other articles of high radiation absorption which prevent the x-rays from fully penetrating the subject. Projection line integrals passing through the regions of high density are so highly attenuated by the high density regions that data about other regions along the line integral are lost or overshadowed. This leads to substantial measurement errors. The filtered backprojection or other reconstruction process translates these measurement errors into image artifacts, e.g. streaks which emanate from the high intensity region. The streaks dramatically deteriorate image quality and can obliterate structure of the region.

A previous method for correcting metal artifacts includes performing filtered backprojection to generate an uncorrected reconstructed image, identifying a region of high density in the uncorrected reconstructed image, and replacing projections that pass through the high density region with synthetic projection data having reduced absorption attenuation values. The corrected projection data again undergoes filtered backprojection to produce a corrected reconstructed image.

This known method works well for certain imaging applications in which there is a single, well-defined high density region surrounded by much lower density tissue. It does not work well, however, with a plurality of high density regions, or where there are medium density regions in addition to the high density region. For such composite imaging subjects, metal artifacts are reduced but remain very visible in the corrected reconstructed image, especially between high density and medium density regions. In medical imaging applications, medium density regions typically correspond to bone while high density regions typically correspond to metal implants, dental fillings, operation clips (used in certain interventional computed tomography applications), prosthesis devices, and the like. Hence, in medical computed tomography imaging, the region of interest commonly contains medium density regions.

There is a need for an automated technique that compensates for metal artifacts in the image yet is simple, cost effective and easy to implement. The present invention contemplates a method and apparatus that overcomes the aforementioned limitations and others.

According to one aspect of the present application, a diagnostic imaging system which automatically corrects metal artifacts in an uncorrected tomographic image caused by high attenuating objects is disclosed. A means clusters pixels of the uncorrected tomographic image. A means classifies pixels of the uncorrected reconstructed image into at least metal, bone, tissue, and air pixel classes to generate a classified image. A means replaces metal class pixels of the classified image with pixel values of another pixel class to generate a metal free classified image. A means forward projects the metal free classified image to generate a model projection data. A means identifies corrupted regions of original projection data contributing to the pixels of the metal class. A means replaces the identified corrupted regions with corresponding regions of the model projection data to generate corrected projection data which is reconstructed by a reconstruction means into a corrected reconstructed image.

According to another aspect of the present application, a method for automatically correcting metal artifacts in an uncorrected tomographic image caused by high attenuating objects is disclosed. Pixels of the uncorrected tomographic image are clustered. Pixels of the uncorrected reconstructed image are classified into at least metal, bone, tissue, and air pixel classes to generate a classified image. Metal class pixels of the classified image are replaced with pixel values of another pixel class to generate a metal free classified image. The metal free classified image is forward projected to generate a model projection data. Corrupted regions of original projection data contributing to the pixels of the metal class are identified. The identified corrupted regions are replaced with corresponding regions of the model projection data to generate corrected projection data. The corrected projection data is reconstructed into a corrected reconstructed image.

One advantage of the present application resides in automatically compensating the image artifacts caused by high attenuation objects.

Another advantage resides in automatically correcting image artifacts in images including a metal or other high density region and a bone or other medium density region.

Another advantage resides in correct radiation therapy planning for the subjects containing highly attenuating objects.

Another advantage resides in applicability of the present application to both original sinogram data and otherwise available reconstructed images.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

Figure 2:
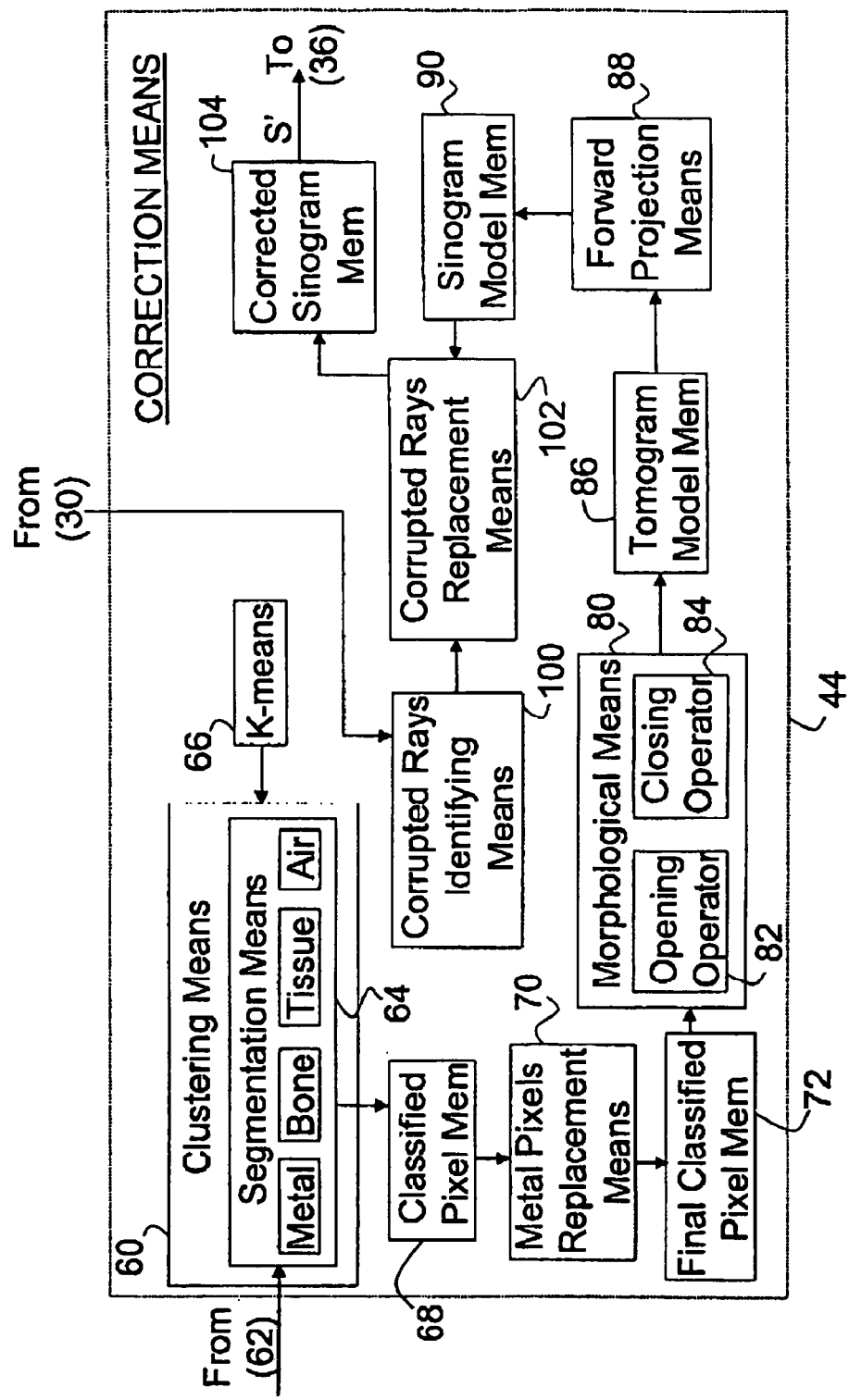
Figure 3A:
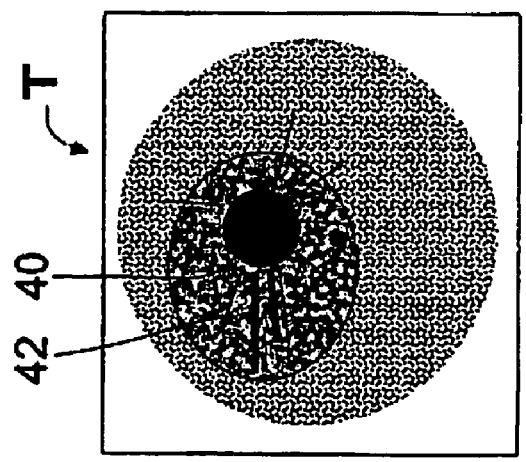
Figure 3B:
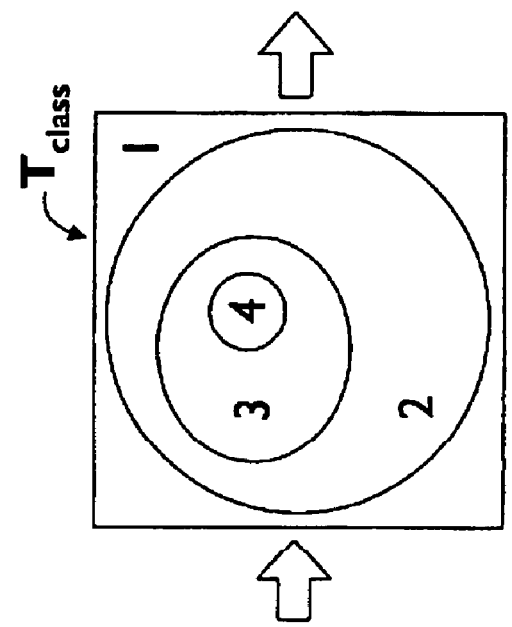

FIG. 1 diagrammatically shows a computed tomography imaging system including an artifact-correcting process according to the present application;

FIG. 2 diagrammatically shows an expanded portion of the computed tomography imaging system including an artifact-correcting process;

FIG. 3A diagrammatically shows an uncorrected reconstructed image;

FIG. 3B diagrammatically shows a classified image; and

Figure 3C:
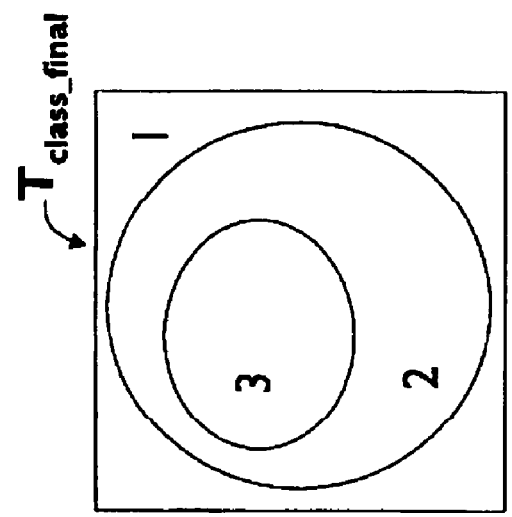

FIG. 3C diagrammatically shows a metal-free image.

With reference to FIG. 1, a imaging system 10 includes a computed tomography scanner 12 having a radiation source 14 that produces a radiation beam directed into an examination region 16. The radiation beam interacts with and is partially absorbed as it traverses a region of interest of an imaging subject disposed in the examination region 16, producing spatially varying absorption of the radiation as it passes through the examination region. A radiation detector 18 detects the absorption-attenuated radiation after it passes through the examination region 16.

Preferably, the radiation source 14 produces a fan-beam or cone-beam of x-rays. The radiation source 14 and the detector 18 are preferably mounted in oppositely facing fashion on a rotating gantry 20 so that the detector 18 continuously receives x-rays from the radiation source 14. As the source 14 and the detector 18 rotate about the examination region 16 on the rotating gantry 20, views are acquired over an angular range of preferably about 360° or more. Optionally, a reduced scan of between about 180° and 360° is used. In one embodiment, the detector 18 is replaced by a stationary detector ring mounted on a stationary gantry 22. Typically, a subject support 26 is linearly movable in an axial or z-direction by a motor means 28.

Multiple-slice computed tomography projection data are acquired by performing successive axial scans with the subject support 26 being stationary during each axial scan and stepped linearly between axial scans. In this arrangement, the detector 18 can have either a single row of detector elements (that is, a one-dimensional detector) or a two-dimensional array of detector elements. Alternatively, helical computed tomography projection data are acquired during continuous linear movement of the subject support 26 and simultaneous rotation of the gantry 20.

The outputs of detector elements of the radiation detector 18 are converted to electric acquired integrated attenuation projection values $\mu d_o$ that are stored in a data memory 30. Each projection datum $\mu d_o$ corresponds to a line integral of attenuation along a line from the radiation source 14 to a corresponding one of the detector elements of the detector 18. The projection data can be represented in a sinogram format in which each two-dimensional slice of the imaged region of interest is represented by a projection data array having coordinates of viewing angle ($\phi$) and line integral index (n).

For typical fan-beam and cone-beam geometries, the line integral index n typically corresponds to a detector index indicating a detector element used to measure the projection of index n. It is contemplated, however, that the line integral index n may lack a direct correspondence with detector element number. Such a lack of direct correspondence can result, for example, from interpolation between rebinned projections.

With continuing reference to FIG. 1, a slice cycling processor 32 cycles through the sinograms corresponding to spatial slices and successively inputs each sinogram into a reconstruction processor 34. The reconstruction processor 34 reconstructs the input data into a 3D uncorrected tomographic image T which is stored in an uncorrected 3D image memory 36. Although picture elements of a 2D or slice image are commonly denoted as "pixels", and elements of a 3D or volume image are often denoted as "voxels"; "pixels" is used herein generally to refer to picture elements of both 2D and 3D images.

With reference to FIG. 3A, the presence of one or more high density regions 40 in the slice typically causes the uncorrected reconstructed image T to include metal artifacts which generally manifest in the image as streaks 42 extending away from the high density region 40. The diagrammatic reconstructed image T of FIG. 3A is not intended to correspond to images of any particular anatomical structure, but rather diagrammatically illustrate features of the artifact-correcting reconstruction process that are typically observable in image space.

With reference again to FIG. 1, a correction means or processor or algorithm 44 performs artifacts correction, in which artifacts introduced by high density regions such as metal clips, high-density dental fillings, or the like, are substantially corrected, even for images that contain discontinuous high density regions or one or more medium density regions in addition to the one or more high density regions. As described in a greater detail below, the correction processor 44 receives an uncorrected image data and outputs a corrected image data which is consequently reconstructed by the reconstruction processor 34 into a corrected 3D tomographic image representation T'. Spatially successive artifact-corrected reconstructed image slices, slabs or volumes are accumulated in a corrected 3D image memory 46 to define a three-dimensional artifact-corrected reconstructed volume image. If, however, the acquired projection data is limited to a single slice of the region of interest, then the acquired projection data corresponding to the single slice is processed by the reconstruction processor 34 and the corrected 3D image memory 46 stores a two-dimensional artifact-corrected reconstructed image. Optionally, projection data corresponding to one or more image slices are acquired over a selected time interval to provide a temporal series of artifact-corrected reconstructed image slices or image volumes representative of a temporal evolution of the region of interest.

A video processor 50 processes some or all of the contents of the corrected 3D image memory 46 or, optionally, of the uncorrected 3D image memory 36 to create a human-viewable image representation such as a three-dimensional rendering, a selected image slice, a maximum intensity projection, a CINE animation, or the like. The human-viewable image representation is displayed on a display 52 of a user interface 54, which is preferably a personal computer, a workstation, a laptop computer, or the like. Optionally, selected contents of image memory 36, 46 are printed on paper, stored in a non-volatile electronic or magnetic storage medium, transmitted over a local area network or the Internet, or otherwise processed. Preferably, a radiologist or other operator controls the computed tomography imaging scanner 12 via an input means 56 to program a scan controller 58 to set up an imaging session, modify an imaging session, execute an imaging session, monitor an imaging session, or otherwise operate the scanner 12.

With continuing reference to FIG. 1 and further reference to FIG. 2, the correction means 44 receives the filtered uncorrected tomographic image data T and applies a clustering technique or process 60 to each pixel in the image data set. The data is clustered into classes so that the data within each class is more similar than those outside that class or in another class. In one embodiment, in which the original sinogram data S is not available, the uncorrected tomographic image T is initially filtered by a tomogram filter means 62, which applies a low pass filter to harmonize noise. Preferably, the filter means 62 applies a two-dimensional Gaussian filter with a 5 by 5 pixel mask and a standard deviation (sigma) of 1. The filtered uncorrected tomographic image T is received as the input by the correction means 44 to compensate for metal artifacts.

With continuing reference to FIG. 2 and further reference to FIG. 3B, the clustering means 60 partitions the uncorrected tomographic image data T into the clusters using a statistical classifier. Preferably, the clustering means 60 employs a statistical k-means classifier. More particularly, a k-means 64 supplies a number of classes and each class properties to the clustering means 60. Preferably, at least four default classes are identified in advance by the user: metal class "4", bones class "3", soft tissue class "2", and air class "1". Alternatively, fixed sets of settings are identified for particular applications and used automatically. The initial mean value for each class is autogenerated and preassigned. Optionally, each class is assigned an equal number of pixels. Optionally, the classes and initial values are defined interactively by the user. The user interactively intervenes, when required, to redefine and reassign the classes and initial values. A segmentation or classifying means or algorithm 66 classifies pixels in the uncorrected tomographic image T into the identified classes to generate a segmented or classified image $T_{class}$ in which pixel values are replaced by class classification index values corresponding to the metal, bone, soft tissue, and air classes.

With continuing reference to FIG. 3B, the pixel classified image $T_{class}$, which is diagrammatically shown in FIG. 3B, has regions of the image essentially consisting of pixels of a particular class labeled by an appropriate class index selected from the class indices "4", "3", "2", "1". The exemplary image includes a region of high density or metal class "4" which could be a metal implant, a region of medium density or bone class "3" which could be a region of bone, both contained within a region of low density or tissue class "2" which could be soft tissue or the like. A region of air density or air class "1" fills the periphery of the pixel density-classified image $T_{class}$ corresponding, for example, to the ambient air surrounding the imaging subject.

With reference again to FIG. 2, the clustering means 60 determines the centroid of each cluster. The clustering means 60 utilizes an iterative algorithm which minimizes the sum over all clusters of within-cluster sums of pixel value-to-cluster centroid distance. As a result, some of the pixels are reassigned to different clusters. New centroids are determined as the input to minimize. The clustering process 60 is continued until the optimum assignment of all pixels is found. The result is a vector containing the cluster indices of each pixel and a vector containing the cluster values. The classified pixel data are stored in a classified pixel memory 68. It is contemplated that other statistical classifiers such as c-mean, fuzzy c-mean, unsupervised Bayesian, and the like might be used.

A metal pixels replacement means 70 assigns a surrounding tissue class value to the pixels or voxels classified into the metal class. Preferably, the bone class value is predetermined as a default value for such pixels. Of course, it is also contemplated that the tissue class value or other class value might be assigned to such pixels. The finalized classified pixels are stored in a final classified pixel memory 72.

With reference to FIG. 3C, in the final classified image $T_{class\_final}$ the regions of high density "4" are effectively removed by replacing pixels in these regions with the gray-scale value for pixels of the medium density class "3", e.g. bone.

With reference again to FIG. 2, although not shown in FIG. 3C, one or more of the regions may have discontinuances, sharp points, or other anatomically incorrect shapes. A morphological means or algorithm 80 performs morphological operations on the image to generate a tomogram model image $T_{model}$. Optionally, the user selects selected regions, e.g. the regions containing severe artifacts, to perform morphological operations on. Preferably, the morphological means 80 uses opening and/or closing algorithms or operators 82, 84 to restore the image content. The opening and closing algorithms 82, 84 use prior knowledge which is inserted into the image to eliminate unwanted artifacts which are known not to be present in the soft tissue by the virtue of human anatomy. For example, it is known that there is no sharp edges in the soft tissue; thus, prior knowledge that there is no sharp edges is incorporated. Preferably, the morphological means 80 eliminates air bubbles, narrow spikes, and other inappropriate data that is known not to be present in the soft issue. Preferably, the shape of the opening/closing operators 82, 84 is a disk with a size between five to eight pixels. Preferably, the user sets the default size and shape, e.g. a disk of six pixels wide, ahead of time. In one embodiment, the user interactively modifies the default size and shape depending on the artifact level: the stronger the artifacts are, the bigger the size of the operator 82, 84 is set at. The resultant tomogram model image $T_{model}$ is stored in a tomogram model memory 86. A forward projection means 88 forward projects the tomogram model image $T_{model}$ to produce a sinogram model image $S_{model}$ which is stored in a sinogram model image memory 90.

A corrupted rays identifying means 100 identifies rays or class "4" regions in the original sinogram data S that pass through the metal, i.e. the corrupted rays to be corrected. Preferably, the corrupted rays identifying means 100 identifies edges/boundaries of regions consisting of the pixels of the high density by one of known techniques after the metal classified pixels are forward projected onto a sinogram.

A corrupted rays replacement means 102 replaces the identified corrupted rays of the original sinogram data S, e.g. projection data corresponding to the rays passing through high density regions, with the projection data from the sinogram model $S_{model}$ to produce a corrected sinogram image S'. Preferably, the corrupted rays replacement means 102 calculates a linear offset or other smooth transition that enables a smooth integration of the corresponding data portions of the sinogram model into the original sinogram. In this manner, the corrupted regions of the original sinogram image S are replaced by the corresponding regions from the sinogram model $S_{model}$.

The metal-free, corrected sinogram image S' is stored in a corrected sinogram image memory 104.

With reference again to FIG. 1, the reconstruction processor 34 uses a standard filtered backprojection means or algorithm 110 to generate a corrected tomographic image. The backprojection means 110 backprojects the corrected sinogram S' to obtain corresponding intermittent corrected tomographic image $T'_{int}$. Preferably, the reconstruction processor 34 uses a Ramachandran-Lakshminarayanan filter. To get a clearer view of the corrections, an extraction means 112 extracts the metal segments from the original uncorrected tomographic image T. A combiner 114 superimposes or combines the extracted metal segments with the intermittent corrected tomographic image $T'_{int}$ to generate a final corrected tomographic image T' which is stored in the corrected 3D image memory 46.

Preferably, the correction process 44 is iteratively repeated such that the classes are redefined and modified. For example, on a subsequent iteration the k-means 64 supplies five classes instead of four classes to further redefine and differentiate data.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having described the preferred embodiments, the invention is now claimed to be:

1. A diagnostic imaging system which automatically corrects metal artifacts in an uncorrected tomographic image caused by high attenuating objects, the system comprising:
    a means for filtering the uncorrected tomographic image to reduce and harmonize noise;
    a means for clustering pixels of the filtered uncorrected tomographic image, which clustering means includes:

a means for classifying pixels of the filtered uncorrected reconstructed image into at least metal, bone, tissue, and air pixel classes to generate a classified image;

a means for replacing metal class pixels of the classified image with pixel values of another pixel class to generate a metal free classified image;

a means for forward projecting the metal free classified image to generate a model projection data;

a means for identifying corrupted regions of original projection data contributing to the pixels of the metal class; and a means for replacing the identified corrupted regions with corresponding regions of the model projection data to generate corrected projection data which is reconstructed by a reconstruction means into a corrected reconstructed image.

2. The system as set forth in claim 1, further including:
a morphological means for using prior knowledge to refine class regions of the metal free classified image.

3. The system as set forth in claim 2, wherein the morphological means removes at least one of bubbles, points, and sharp edges from the metal free classified image.

4. The system as set forth in claim 1, further including:
a k-means for providing at least one of a class definition, number of classes, and initial grayscale value for each class.

5. The system as set forth in claim 1, wherein the clustering means uses one of k-mean classifier, c-mean classifier, fuzzy c-mean classifier, and unsupervised Bayesian classifier cluster pixels into the classes.

6. The system as set forth in claim 1, wherein the clustering means receives the reconstructed image for iteratively improving the corrected reconstructed image.

7. The system as set forth in claim 6, wherein the clustering means refines correction of the metal artifacts by iteratively modifying at least one of a class definition, number of classes and an initial grayscale value of at least one class.

8. The system as set forth in claim 1, further including:
a user input means by which a user defines at least one of a class definition, number of classes and an initial value of at least one class.

9. The system as set forth in claim 1, wherein the corrupted regions replacing means interpolatively adjusts the model projection data to smooth transitions between the model projection data and the projection data.

10. A method for automatically correcting metal artifacts in an uncorrected tomographic image caused by high attenuating objects, comprising:
filtering the uncorrected tomographic image to reduce and harmonize noise;
clustering pixels of the filtered uncorrected tomographic image;
classifying pixels of the filtered uncorrected reconstructed image into at least metal, bone, tissue, and air pixel classes to generate a classified image;
replacing metal class pixels of the classified image with pixel values of another pixel class to generate a metal free classified image;
forward projecting the metal free classified image to generate a model projection data;
identifying corrupted regions of original projection data contributing to the pixels of the metal class;
replacing the identified corrupted regions with corresponding regions of the model projection data to generate corrected projection data; and
reconstructing the corrected projection data into a corrected reconstructed image.

11. The method as set forth in claim 10, wherein the pixels are clustered iteratively by a use of an iterative classifier function.

12. The method as set forth in claim 11, wherein the classifier function is one of k-mean classifier, c-mean classifier, fuzzy c-mean classifier, and unsupervised Bayesian classifier.

13. The method as set forth in claim 10, further including:
using prior knowledge to refine class regions of the metal free classified image.

14. The method as set forth in claim 10, further including:
removing at least one of bubbles, points, and sharp edges from the metal free classified image.

15. The method as set forth in claim 10, wherein the reconstructing the corrected projection data into the corrected reconstructed image includes:
reconstructing the corrected projection data using filtered backprojection.

16. The method as set forth in claim 10, wherein the original projection data is reconstructed by applying Radon transform to the uncorrected tomographic image and the corrupted regions are identified and replaced in the reconstructed original projection data.

17. A diagnostic imaging system including:
a reconstruction processor which reconstructs projection data into a reconstructed image;
a filter which reduces and harmonizes noise of the uncorrected tomographic image
a classifying algorithm which classifies pixels of the uncorrected tomographic image at least into metal, bone, tissue, and air pixel classes;
a pixel replacement algorithm which replaces pixels of the reconstructed image that are classified into the metal class with pixel values of at least one other class to generate a metal free image;
a morphological algorithm which applies prior knowledge to the metal free image to refine classification regions of the metal free image based on known characteristics of subject anatomy;
a forward projection algorithm which forward projects the metal free image to generate model projection data; and
a replacement algorithm which replaces corrupted portions of the projection data which corrupted portions contribute to the pixels of the metal class with corresponding portions of the model projection data to generate corrected projection data, which is reconstructed by the reconstruction processor into a corrected tomographic image.

* * * * *